United States Patent
Persson

(10) Patent No.: US 7,993,069 B2
(45) Date of Patent: Aug. 9, 2011

(54) BALL JOINT DEVICE

(75) Inventor: Martin Persson, Umeå (SE)

(73) Assignee: Zirkona Sweden AB, Umea (SE)

( * ) Notice: Subject to any disclaimer, the term of this patent is extended or adjusted under 35 U.S.C. 154(b) by 103 days.

(21) Appl. No.: 12/276,181

(22) Filed: Nov. 21, 2008

(65) Prior Publication Data

US 2009/0136290 A1    May 28, 2009

Related U.S. Application Data

(60) Provisional application No. 60/996,661, filed on Nov. 28, 2007.

(30) Foreign Application Priority Data

Nov. 23, 2007    (EP) .................................... 07121418

(51) Int. Cl.
    *F16M 11/14*    (2006.01)
(52) U.S. Cl. ........ 403/56; 403/90; 248/288.51; 248/919
(58) Field of Classification Search ..................... 403/56, 403/90; 248/919–922, 288.31, 288.51
    See application file for complete search history.

(56) References Cited

U.S. PATENT DOCUMENTS

| | | | | | |
|---|---|---|---|---|---|
| 290,103 | A | * | 12/1883 | Paul .................................. | 135/90 |
| 569,436 | A | * | 10/1896 | Spurr ........................... | 74/551.4 |
| 1,086,145 | A | * | 2/1914 | Dodds ........................... | 411/379 |
| 1,827,432 | A | * | 10/1931 | Hundemer ................. | 285/146.2 |
| 2,260,995 | A | * | 10/1941 | Kruczek ........................ | 403/90 |
| 2,456,182 | A | * | 12/1948 | Goble ......................... | 285/153.3 |
| 2,859,983 | A | * | 11/1958 | May ................................. | 285/90 |
| 3,211,405 | A | * | 10/1965 | Fey et al. .................... | 248/183.2 |
| 3,843,083 | A | * | 10/1974 | Angibaud ................ | 248/229.14 |
| 4,300,849 | A | * | 11/1981 | Henry ............................. | 403/11 |
| 4,447,139 | A | * | 5/1984 | Biber ............................ | 359/384 |
| 4,704,043 | A | * | 11/1987 | Hackman et al. ............... | 403/56 |
| 4,767,231 | A | * | 8/1988 | Wallis ............................. | 403/56 |
| 4,974,802 | A | * | 12/1990 | Hendren .................... | 248/181.1 |
| 5,072,907 | A | * | 12/1991 | Vogt ........................... | 248/181.1 |
| 5,304,177 | A | * | 4/1994 | Pennig ........................... | 606/58 |
| 5,409,269 | A | * | 4/1995 | Karlsson et al. ........... | 285/146.1 |
| 5,419,522 | A | * | 5/1995 | Luecke et al. ............ | 248/288.51 |
| 5,803,642 | A | * | 9/1998 | Sassmannshausen .......... | 403/90 |

(Continued)

FOREIGN PATENT DOCUMENTS

DE    8910801    1/1990

(Continued)

*Primary Examiner* — Joshua T Kennedy
(74) *Attorney, Agent, or Firm* — Birch, Stewart, Kolasch & Birch, LLP

(57) ABSTRACT

A double ball joint device comprises a housing, a first joint element having a first ball mounted in the housing, and a first shaft attached to a portion of the first ball protruding through an opening in the housing, and a second joint element having a second ball, which is mounted similar to the first ball and is provided with a corresponding second shaft. A locking washer is arranged between the first and second balls and has a first seat for receiving the first ball, and an opposite second seat for receiving the second ball. An operation member is operable between a released state, where the joint elements are pivotable, and a locked state, where it urges the locking washer to clamp lock the joint elements in a current position. When moving the operation member to the locked state it urges the washer to an off-centre position.

17 Claims, 5 Drawing Sheets

U.S. PATENT DOCUMENTS

| | | |
|---|---|---|
| 6,119,995 A | 9/2000 | Reese et al. |
| 7,717,938 B2 * | 5/2010 | Kim et al. ............ 606/250 |
| 2005/0001116 A1 | 1/2005 | Vogt |
| 2005/0095058 A1 * | 5/2005 | Biba et al. ............ 403/56 |
| 2009/0065671 A1 * | 3/2009 | Burgstaller ............ 248/288.31 |

FOREIGN PATENT DOCUMENTS

| | | |
|---|---|---|
| EP | 1473510 A1 | 11/2004 |

* cited by examiner

BALL JOINT DEVICE

FIELD OF THE INVENTION

The present invention relates to the field of ball joint devices, and more particularly to a lockable double ball joint device having a housing and a first and a second joint elements mounted in the housing and releasably lockable in different positions, and to an appliance holder comprising such a lockable double ball joint device.

BACKGROUND OF THE INVENTION

Lockable ball joints are useful in many different applications, such as camera supports, wheelchairs, tool holders, etc. One typical example of a lockable double ball joint is recognized as Manfrotto 155 double ball joint head, which is primarily used for a camera support. It comprises two plate shaped halves having recesses constituting ball seats. In order to lock the joint a screw is used to tighten the halves together. This joint is open at the sides thereby being vulnerable to dirt.

The present invention is in particular directed to appliance holders such as computer holders, and one application area of particular interest is vehicles. Today a driver of a vehicle often needs to bring a computer along in the vehicle, as a tool of labour or for private use. In order for the computer to be easily accessible it is convenient to have it mounted on a computer holder in the vehicle. Further, it is convenient that the computer holder is settable in different positions such that the computer can be moved into an operation position when the driver wants to use it and into a resting position when the driver is to start driving the vehicle. For that purpose computer holders comprising a lockable ball joint have been developed. However the computer holders existing on the market all suffer from being too week. The ball joint does not lock well enough to withstand the forces arising when a vehicle is driven on a bumpy ground.

SUMMARY OF THE INVENTION

It is an object of the present invention to provide a lockable ball joint that locks strongly enough to be useful in hard environments.

The object is achieved by a lockable double joint according to the invention as defined in claim 1.

Thus, according to the present invention there is provided a double ball joint device comprising:
  a housing;
  a first joint element comprising a first ball, wherein a major portion of said first ball is mounted and retained within said housing and a minor portion of the first ball protrudes from said housing through a first opening thereof, and a first shaft, which is attached to the first ball at said minor portion thereof;
  a second joint element comprising a second ball, wherein a major portion of said second ball is mounted and retained within said housing and a minor portion of the second ball protrudes from said housing through a second opening thereof, and a second shaft, which is attached to the second ball at said minor portion thereof;
  a locking washer, which is arranged between said first and second balls and which comprises a first seat for receiving said first ball, and an opposite second seat for receiving said second ball; and
  an operation member, which is operable between a locked state where it urges said locking washer to clamp lock said first and second joint elements in a current position, and a released state where it releases said locking washer thereby releasing the joint elements, wherein the joint elements are pivotable, at said released state, into a desired position.

This structure where the locking washer, operated by the operation member, is used as a clamping element to clamp both joint elements in the locking position has shown to be strong enough to easily carry a rather heavy appliance, such as a lap top, at attractively small dimensions of the double ball joint device.

In accordance with an embodiment of the double ball joint device the first and second balls, in said locking state, are urged into engagement with first and second inner wall portions of said housing at said first and second opening, respectively. It is an advantage to use surface engagement of the inner wall portions as a means of obtaining a high strength at the locking state.

In accordance with an embodiment of the double ball joint device the first and second inner wall portions each has the same curvature radius as the respective first and second balls. Thus, it is ascertained that a noticeable part of the inner wall surface engages with the balls.

In accordance with an embodiment of the double ball joint device the operation member comprises a rotatable threaded rod that extends through a threaded hole of said housing, and an operation lever attached to the threaded rod.

In accordance with an embodiment of the double ball joint device the operation member comprises an engagement rod extending through a hole of said housing and being slidably movable radially of the housing, and an operation lever hingedly attached to said engagement rod.

In accordance with an embodiment of the double ball joint device the housing comprises two halves attached to each other. A first half thereof comprises said first opening, and a second half thereof comprises said second opening.

In accordance with an embodiment of the double ball joint device a mouth defining said first opening or a mouth defining said second opening comprises a slot being capable of housing said first or second shaft respectively.

In accordance with an embodiment of the double ball joint device a mouth defining said first opening and a mouth defining said second opening both comprise a slot being capable of housing said first and second shaft respectively.

Further objects and advantages of the present invention will be evident from the following description of embodiments.

BRIEF DESCRIPTION OF THE DRAWINGS

Exemplifying embodiments of the double ball joint device according to the invention will be described below with reference to the accompanying drawings, in which.

DESCRIPTION OF EMBODIMENTS

Figures 1, 2:
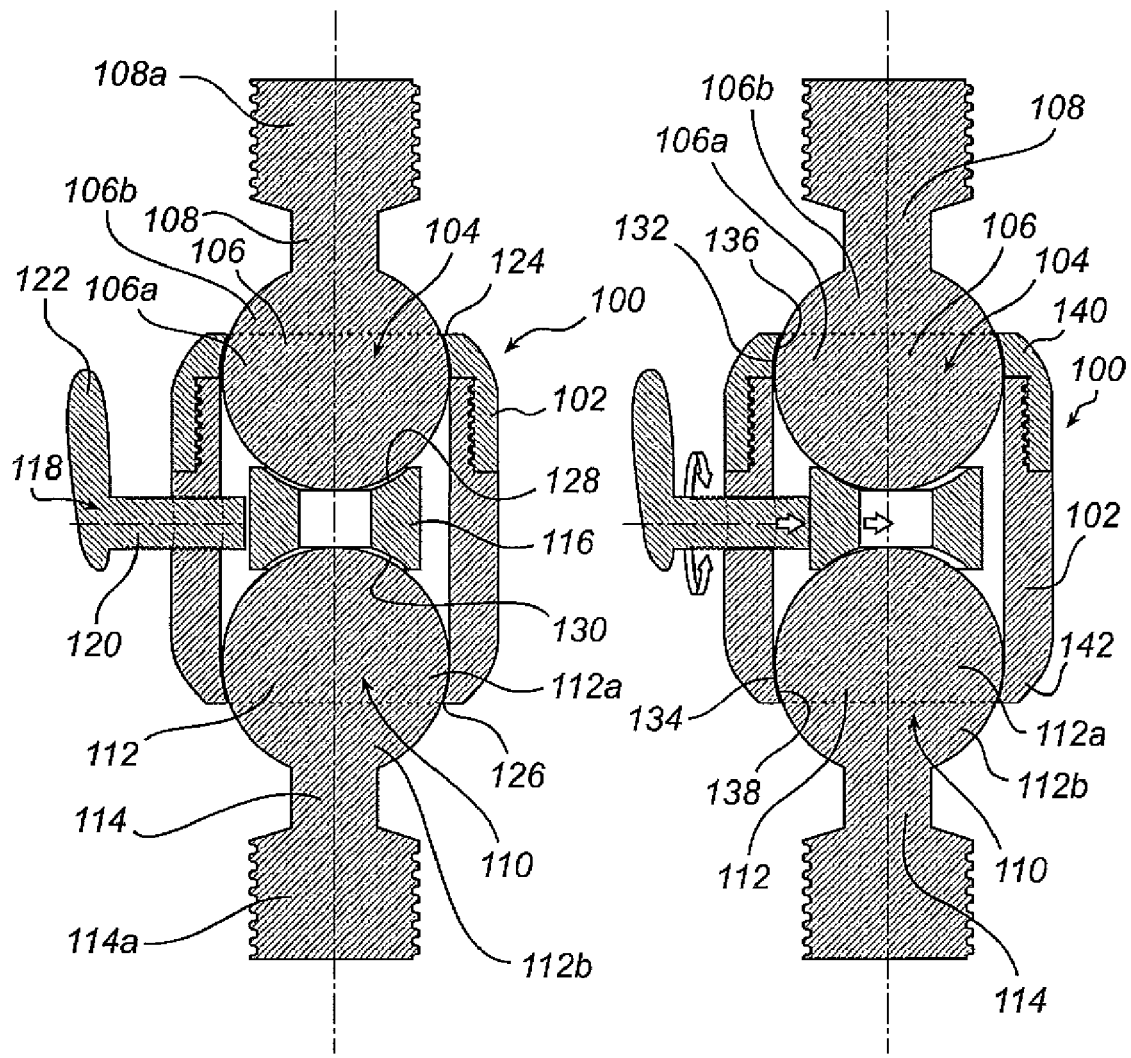
FIG. 1 is a schematic cross sectional view of an embodiment of the double ball joint device in a released state.
FIG. 2 is a schematic cross sectional views of the double ball joint device in a locked state.

Referring to FIG. 1, a double ball joint device 100 comprises a housing 102, a first joint element 104, which has a first ball 106 and a first shaft 108, a second joint element 110, which has a second ball 112 and a second shaft 114, a locking washer 116, and an operation member 118, which comprises a threaded rod 120 and an operation lever 122.

A major portion 106a of the first ball 106 is mounted and retained within the housing 102, and a minor portion, or top portion, 106b of the first ball 106 protrudes from the housing 102 through a first opening 124 thereof. The first shaft 108 is attached to the minor portion 106b of the first ball 106. The border between the major and minor portions 106a,b of the first ball 106 is illustrated by a dashed line in FIG. 1. At the same time that dashed line illustrates the mouth of the first opening 124.

The double ball joint device 100, in this embodiment, is symmetric as regards the ball-housing structure, such that a major portion 112a of the second ball 112 is mounted within the housing 102 and a minor portion, or top portion, 112b thereof protrudes from the housing 102 through a second opening 126 thereof. The second shaft 114 is attached to the second ball 112 at said minor portion 112b thereof. The second opening 126 is, thus, formed opposite of the first opening 124. In this first embodiment, the first and second openings 124, 126 are circular and have equal diameters, which are smaller than the diameters, mutually equal as well, of the first and second balls 106, 112, respectively. The housing 102 is substantially cylindrical. Each respective first and second shafts 108, 114 has a threaded end portion, or head portion, 108a, 114a at which a suitable device is mountable, as will be exemplified below with a lap top holder.

The locking washer 116 is arranged between the first and second balls 106, 112. It comprises a first seat 128 for receiving the first ball 106, and more particularly a bottom portion thereof, and a second seat 130 for receiving the second ball 112, and more particularly a bottom portion thereof.

In FIG. 1 the double ball joint device 100 is shown in a released state, i.e. the balls 106, 112 are movable relative to the housing 102. The movement could be regarded as a rotation or pivotation. The movement is only limited by the mouth of the respective first and second opening 124, 126, which is hit by the respective first and second shaft 108, 114 at a limit angle taken from an origination position where the first and second shafts 108, 114 are mutually aligned as well as aligned with a longitudinal centre axis of the housing 102. In this released state in the origination position the locking washer 116 is approximately centred relative to said longitudinal centre axis of the housing. Further the operation member 118 is in a retracted position where it is non-engaged with the locking washer 116.

By screwing in the operation member into engagement with the locking washer 116, and further such that it pushes the locking washer sideways, i.e. radially of the housing 102, to an off-centre position wherein both seats 128, 130 engage with bottom portions of the balls 106, 112 while pushing the balls 106, 112 towards the openings 124, 126. By applying a tensioning force to the operation lever 122, i.e. by tightening the threaded rod 120, the locking washer 116 is urged to clamp lock the first and second joint elements 104, 110, thereby being fixed in a current position. Then the double ball joint 100 is in a locked state, as shown in FIG. 2. In this locked state each ball 106, 112 is biased against the inner wall of the housing 102. More particularly, an upper most surface portion 132, 134 of the respective major portion 106a, 112a extending between the middle of the ball 106, 112 and the border between the major portion 106a, 112a and the minor portion 106b, 112b, engages with an adjacent surface portion 136, 138 of the inner wall of the housing 102. This engagement is obtained due to the curved shape of respective first and second end portions 140, 142, of respective interconnected halves, of the of the housing 102. This curved shape is adapted to the curvature of the respective first and second balls 106, 112, such that the curvature radii are equal. Due to the friction of the surface engagement a relative high force can be applied to the respective first and second shaft 108, 114 without moving the ball joints 104, 110 relative to the housing 102. In other words a strong double ball joint device 100 is achieved.

Figure 3:
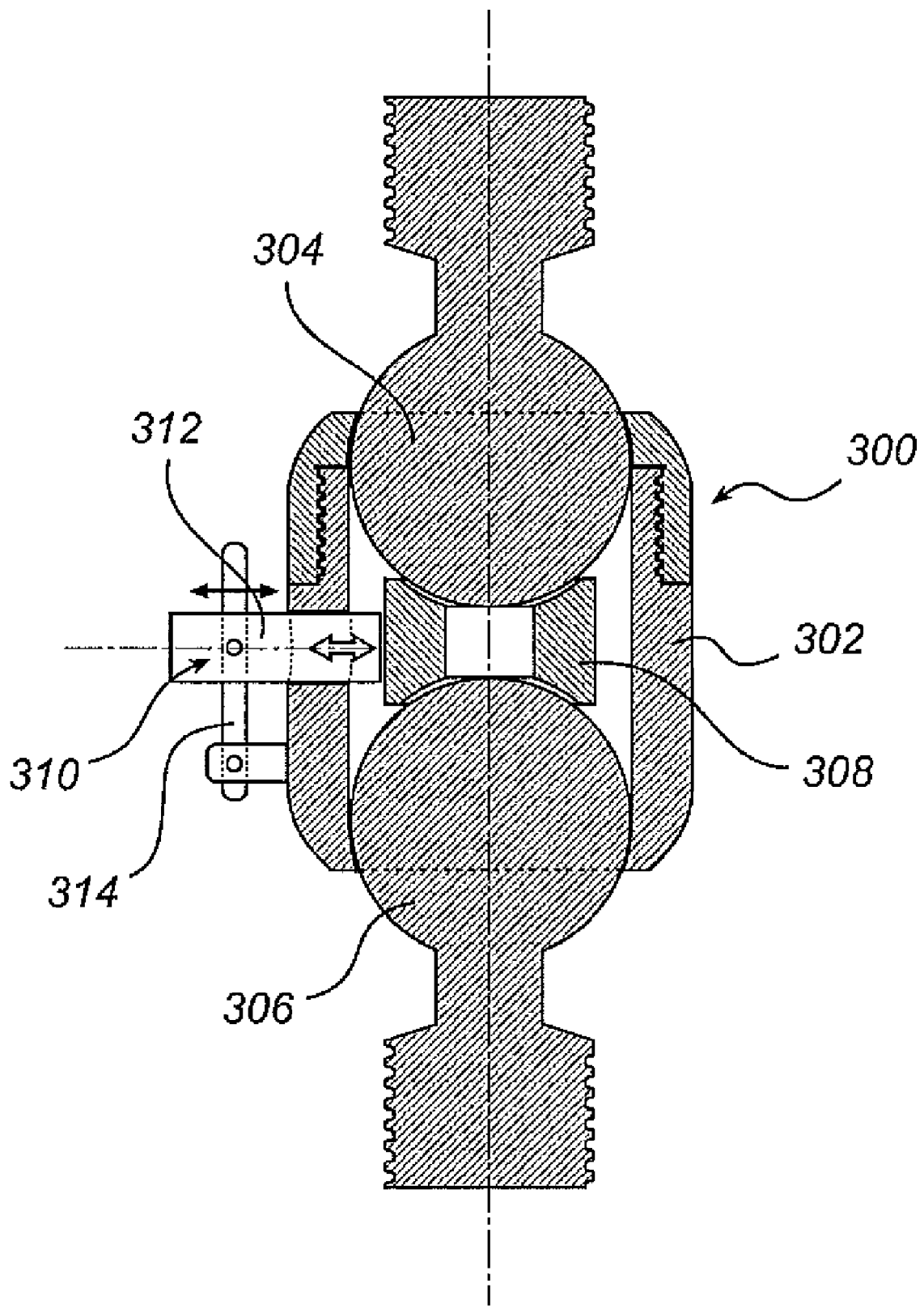
FIG. 3 is a schematic cross sectional view of another embodiment of the double ball joint device.

According to a second embodiment of the double ball joint 300, as most schematically illustrated in FIG. 3, the operation member 310 works according to a different principle than the operation member 118 of the first embodiment. More particularly, an engagement rod 312 of the operation member 310 is slidably movable radially of the housing 302, and an operation lever 314 is hingedly connected with the engagement rod 312. Thus, by operating the operation lever 314 the engagement rod 312 is radially movable into engagement with the locking washer 308 for locking the first and second joint elements 304, 306, in the same way as in the first embodiment, or out of engagement with the locking washer 308 for releasing the first and second joint elements 304, 306. It should be noted that the operation member is most schematically illustrated only to show the operation principle.

Figure 4:
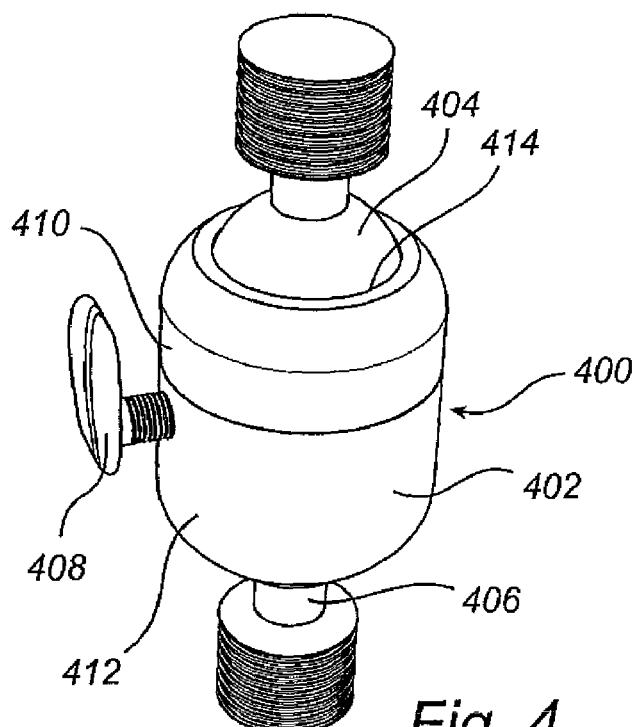
FIG. 4 is a schematic perspective view of an embodiment of the double ball joint device.

In FIG. 4 the double ball joint device 400 is shown in a perspective view, wherein a housing 402, first and second joint elements 404, 406, and an operation member 408 are shown. The housing 402 is made in two halves 410, 412, which are assembled, wherein each half comprises a respective first opening 414 and second opening (not visible in the figure).

Figure 6:
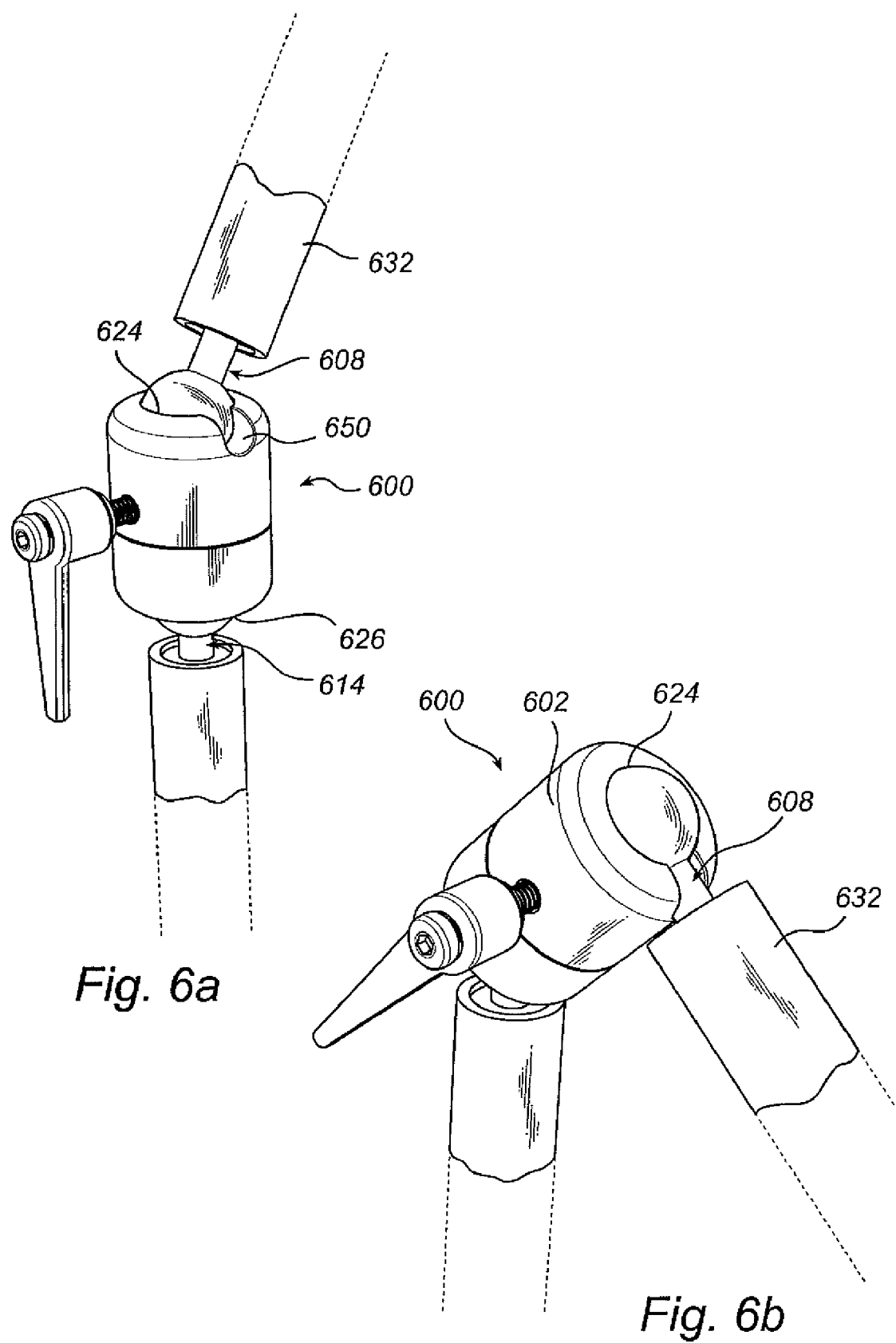
FIGS. 6*a*, 6*b* and 7 are schematic perspective views of another embodiment of the invention.

In FIGS. 6a and 6b the double ball joint device 600 according to a another embodiment is shown in perspective views, wherein a housing 602 comprises a slot 650 in a mouth defining the first opening 624. The slot 650 allows for a device with a high degree of flexibility since it widens the range of possible limit angles. A double ball joint device 600 according to this embodiment has such an adjustability that the inclination of the sub-structure to which the device is to be attached is of little or no importance. Another advantage with this embodiment is that it ensures an even more sturdy clamping since any movement of the upper support arm 632 relative to the housing 602 along the mouth of the first opening 624 is rendered impossible with the first shaft 608 positioned in the slot 650 as can be seen in FIG. 6b.

Figure 7:
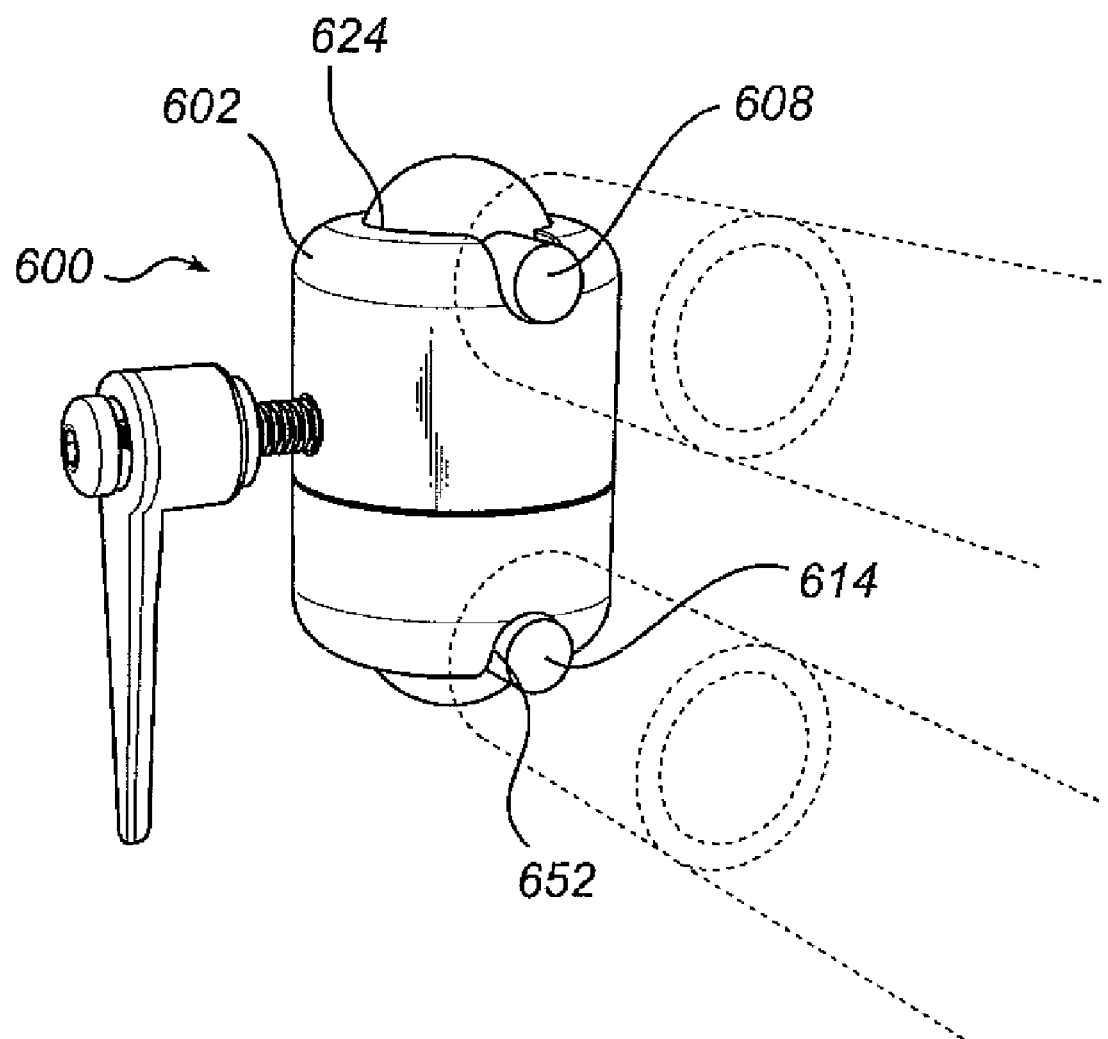

Further, if both the first and second openings 624, 626 are provided with such a slot 650, 652, as can be seen in FIG. 7, the first shaft 608 as well as the second shaft 614 can be received in the respective slots 650, 652. When received in the slots 650, 652 the shafts 608, 614 can be set parallel to each other, thereby providing a space saving modus of the device. Consequently if, for example, the device need not be used at all time, the device can be folded so that it does not interfere more than absolutely necessary.

Figure 5:
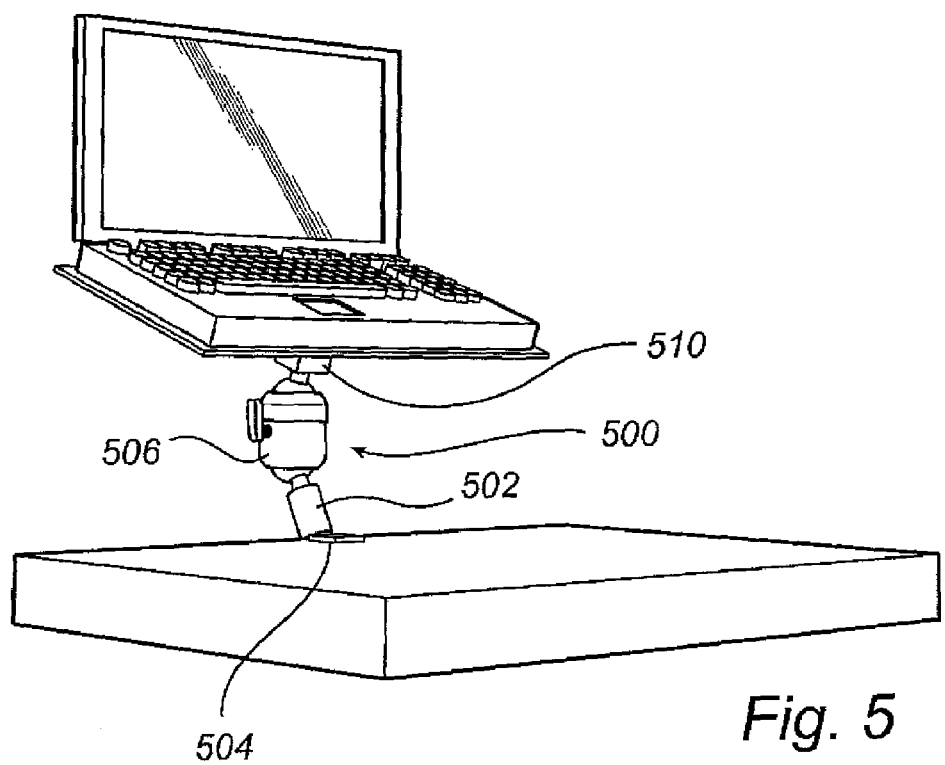
FIG. 5 is a schematic illustration of an embodiment of a computer holder comprising the double ball joint device of the present invention.

The double ball joint device is useful in a wide area of applications. However, a particular application within the scope of this invention is a lap top holder 500, as illustrated in FIG. 5. The lap top holder 500 comprises a lower support arm 502, which is provided with an appropriate mounting device 504, a double ball joint device 506, which is attached to the lower support arm at the second shaft via a threaded connection, and an upper support arm 510, which is arranged to carry a lap top, and which is also attached to the double ball joint device 506 but at the first shaft via a threaded connection. By means of the double ball joint device 506, the lap top holder 500 is settable in various positions, where the support arms 502, 510 are steplessly fixable at an optional angle to each other.

Above preferred embodiments of the double ball joint according to the present invention have been described. These should be seen as merely non-limiting examples. Many modifications will be possible within the scope of the invention as defined by the appended claims.

The invention claimed is:

1. A double ball joint device comprising:
   a housing;
   a first joint element comprising a first ball, wherein a major portion of said first ball is mounted and retained within said housing and a minor portion of the first ball protrudes from said housing through a first opening thereof, and a first shaft, which is attached to the first ball at said minor portion thereof;
   a second joint element comprising a second ball, wherein a major portion of said second ball is mounted and retained within said housing and a minor portion of the second ball protrudes from said housing through a second opening thereof, and a second shaft, which is attached to the second ball at said minor portion thereof;
   a locking washer, which is arranged between said first and second balls and which comprises a first seat for receiving said first ball, and an opposite second seat for receiving said second ball; and
   an operation member, which is operable between a locked state where it urges said locking washer to clamp lock said first and second joint elements in a current position, and a released state where it releases said locking washer thereby releasing the joint elements, wherein the joint elements are pivotable, at said released state, into a desired position,
   wherein the operation member, when operated in the locked state, urges said locking washer to an off-centre position.

2. A double ball joint device according to claim 1, wherein said first and second balls, in said locking state, are urged into engagement with first and second inner wall portions of said housing at said first and second opening, respectively.

3. A double ball joint device according to claim 2, wherein said first and second inner wall portions each has the same curvature radius as the respective first and second balls.

4. A double ball joint device according to claim 3, wherein said operation member comprises a rotatable threaded rod that extends through a threaded hole of said housing, and an operation lever attached to the threaded rod.

5. A double joint device according to claim 3, wherein said operation member comprises an engagement rod extending through a hole of said housing and being slidably movable radially of the housing, and an operating lever hingedly attached to said engagement rod.

6. A double joint device according to claim 3, wherein said housing comprises two halves attached to each other, each half comprising a respective one of said first and second openings.

7. A double ball joint device according to claim 3, wherein a mouth defining said first opening comprises a slot, said slot having a width substantially corresponding to a diameter of said first shaft and a depth corresponding to at least a radius of said first shaft.

8. A double ball joint device according to claim 2, wherein said operation member comprises a rotatable threaded rod that extends through a threaded hole of said housing, and an operation lever attached to the threaded rod.

9. A double joint device according to claim 2, wherein said operation member comprises an engagement rod extending through a hole of said housing and being slidably movable radially of the housing, and an operating lever hingedly attached to said engagement rod.

10. A double joint device according to claim 2, wherein said housing comprises two halves attached to each other, each half comprising a respective one of said first and second openings.

11. A double ball joint device according to claim 2, wherein a mouth defining said first opening comprises a slot, said slot having a width substantially corresponding to a diameter of said first shaft and a depth corresponding to at least a radius of said first shaft.

12. A double ball joint device according to claim 1, wherein said operation member comprises a rotatable threaded rod that extends through a threaded hole of said housing, and an operation lever attached to the threaded rod.

13. A double joint device according to claim 1, wherein said operation member comprises an engagement rod extending through a hole of said housing and being slidably movable radially of the housing, and an operating lever hingedly attached to said engagement rod.

14. A double joint device according to claim 1, wherein said housing comprises two halves attached to each other, each half comprising a respective one of said first and second openings.

15. A double ball joint device according to claim 1, wherein a mouth defining said first opening comprises a slot, said slot having a width substantially corresponding to a diameter of said first shaft and a depth corresponding to at least a radius of said first shaft.

16. A double ball joint device according to claim 1, wherein a mouth defining said second opening comprises a slot, said slot having a width substantially corresponding to a diameter of said second shaft and a depth corresponding to at least a radius of said second shaft.

17. A lap top holder comprising a lower support arm, a double ball joint device according to claim 1, which is attached to the lower support arm at said second shaft, and an upper support arm, which is arranged to support a lap top, and which is attached to said double ball joint device at said first shaft.

* * * * *